UNITED STATES PATENT OFFICE.

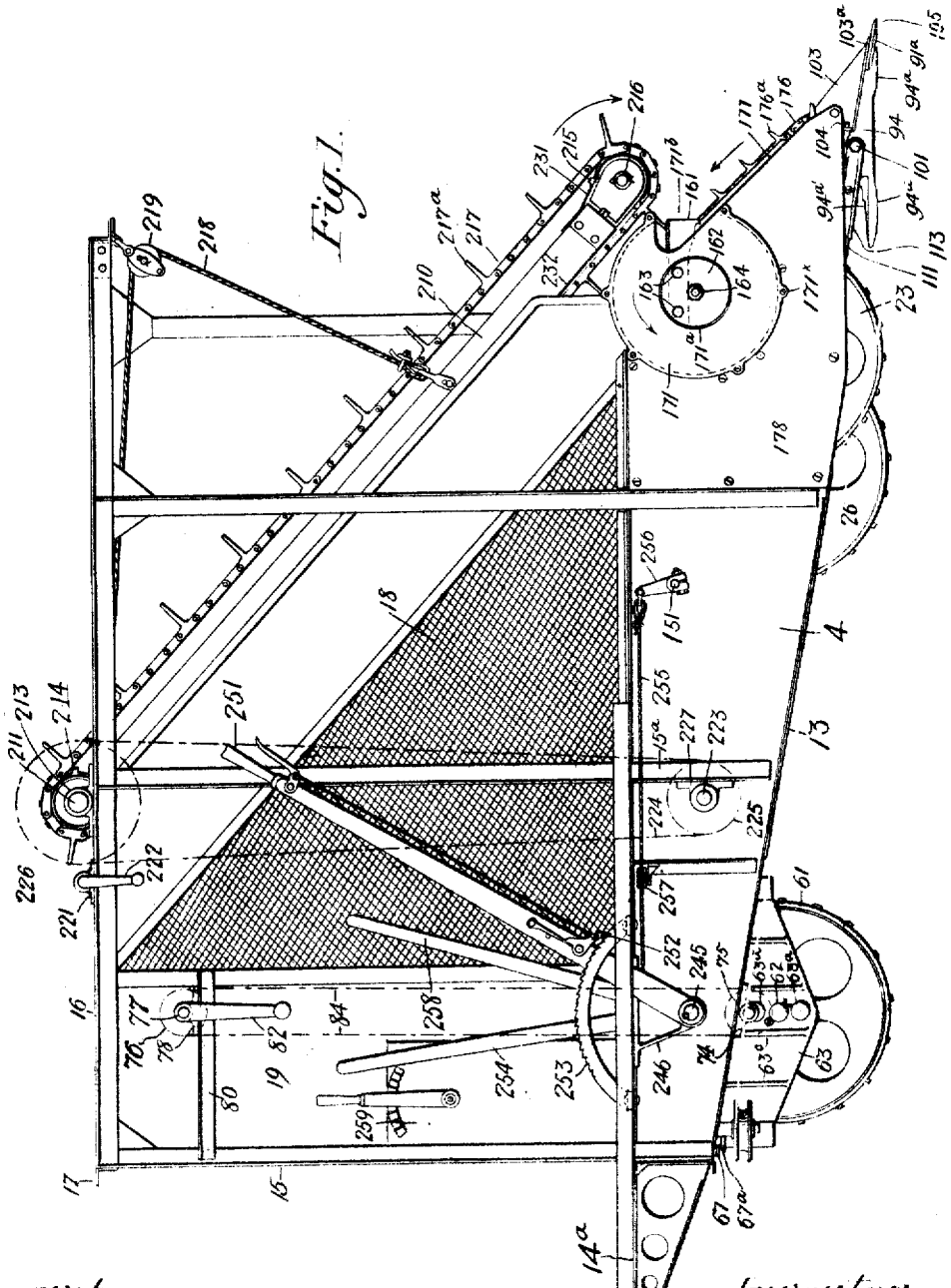

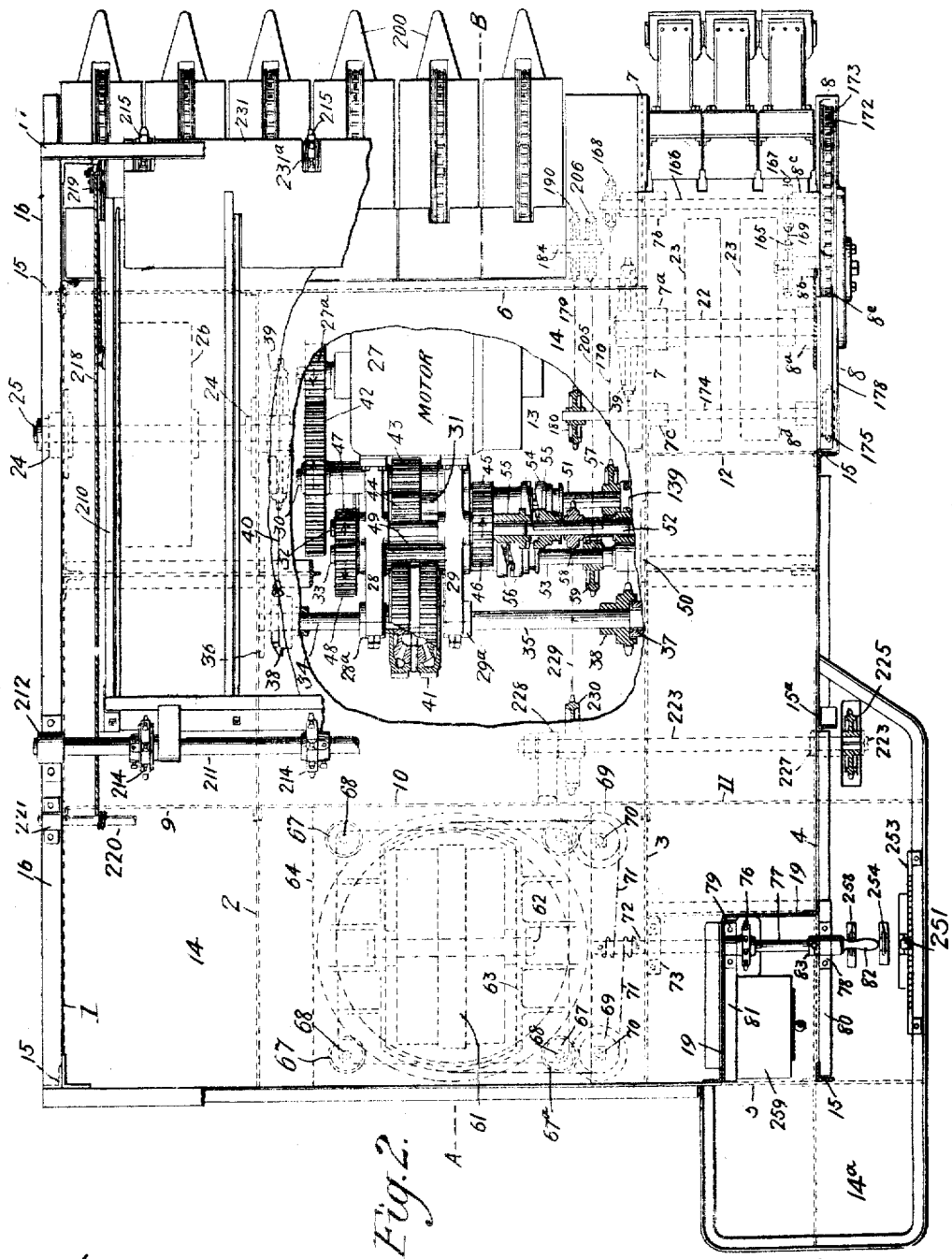

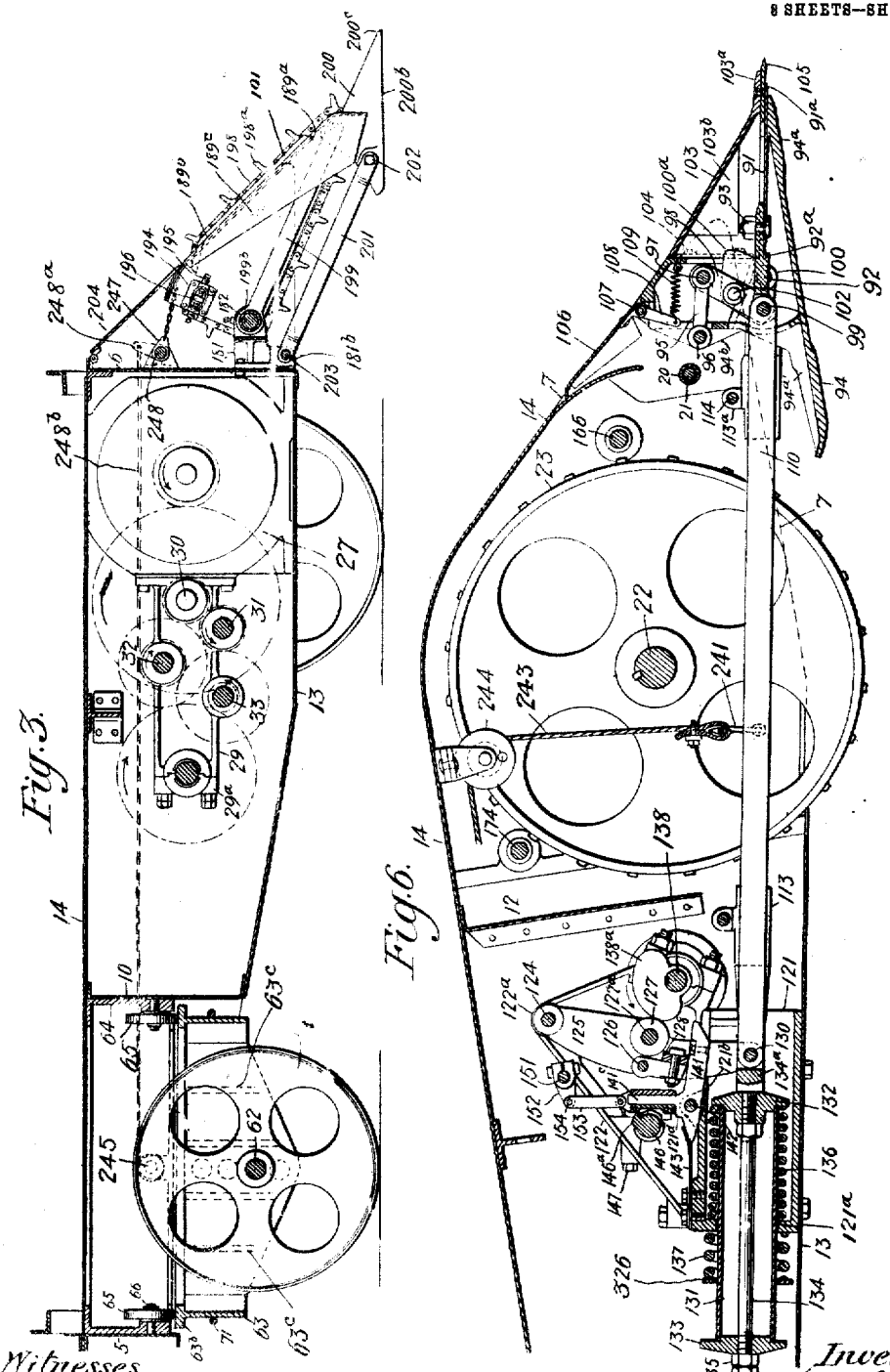

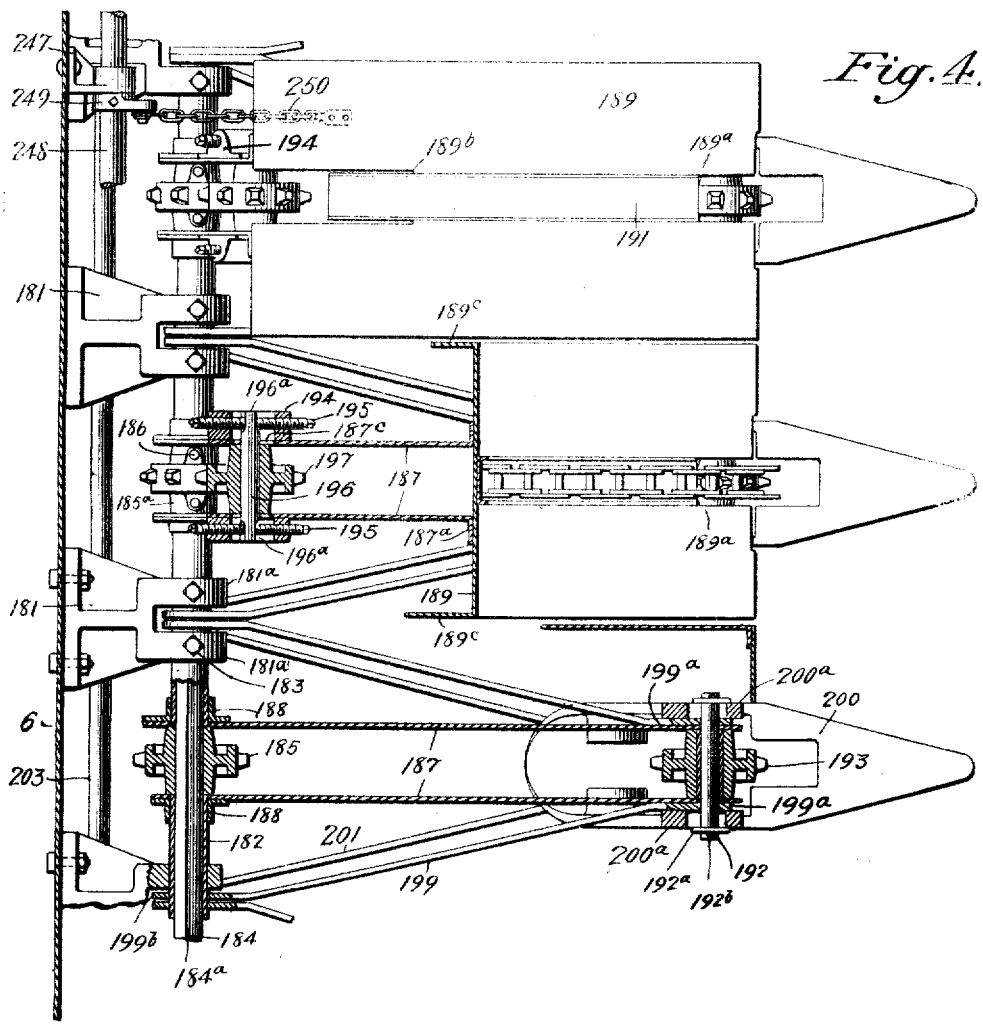

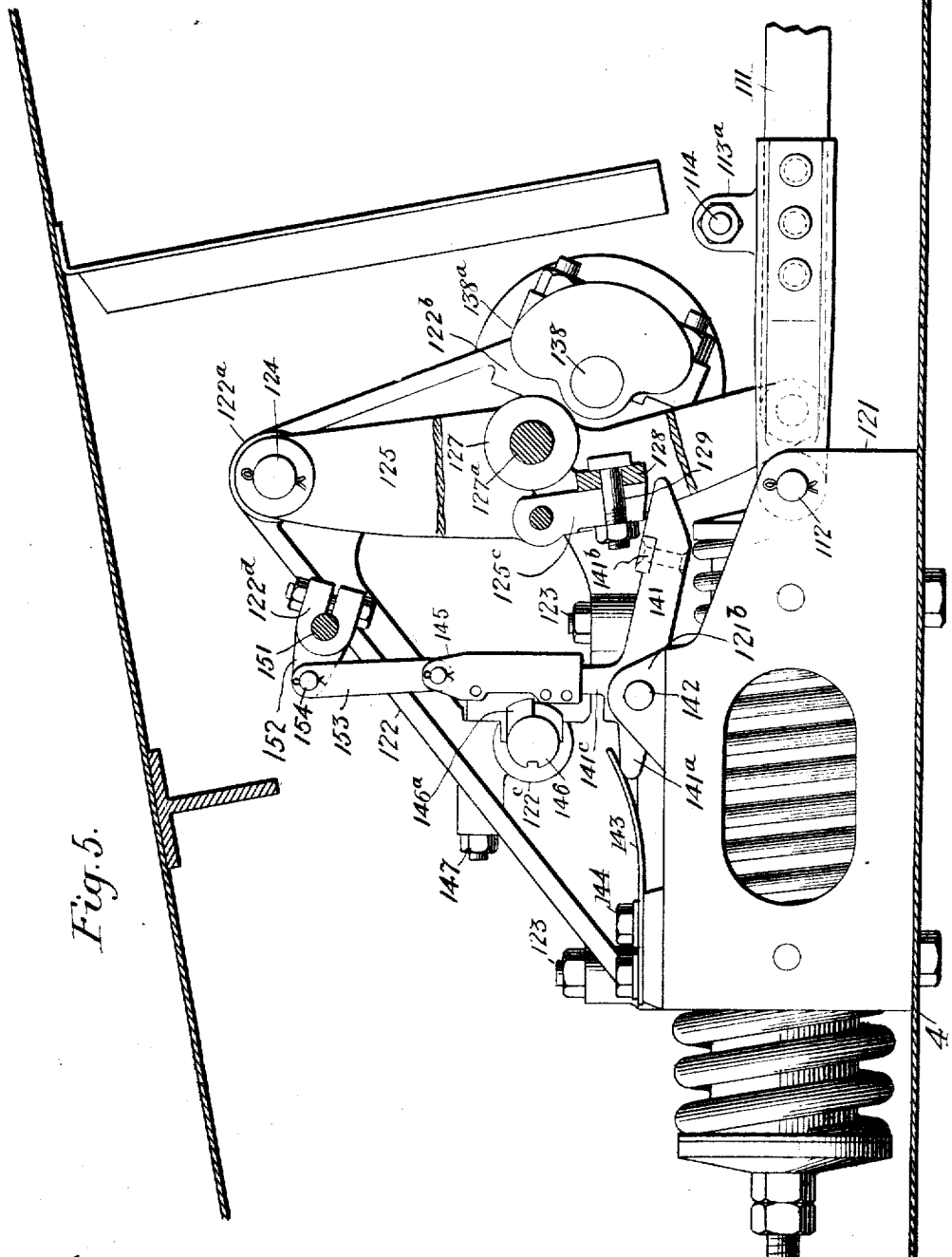

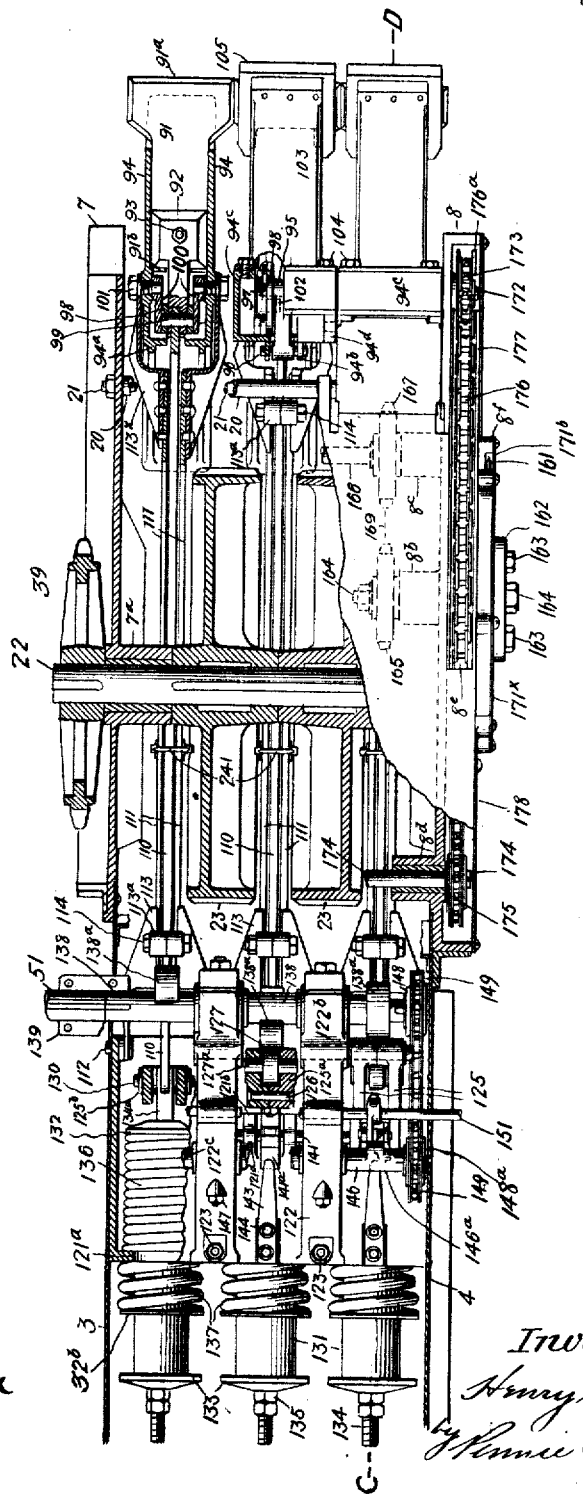

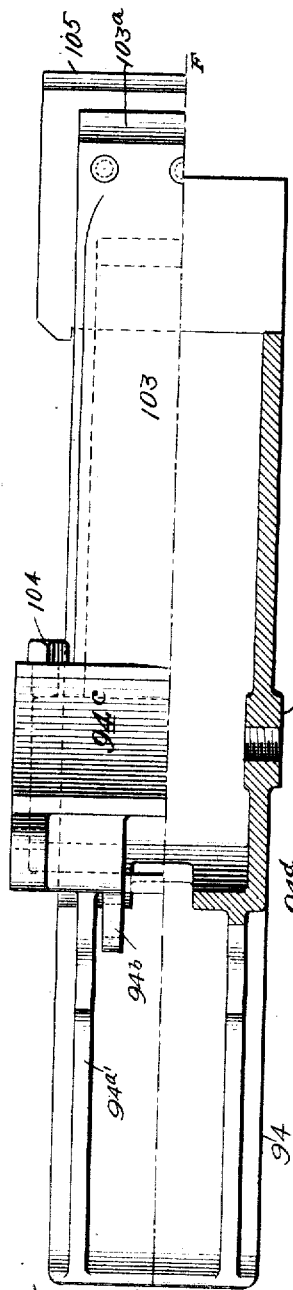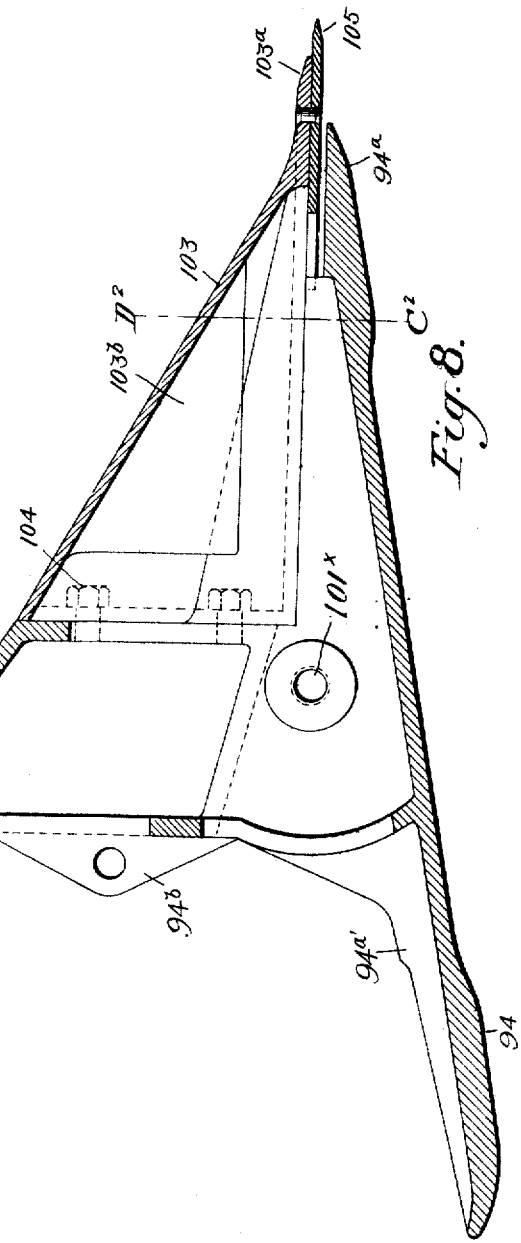

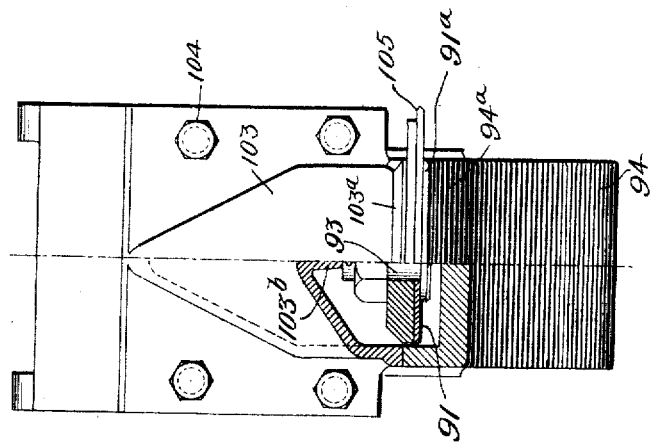
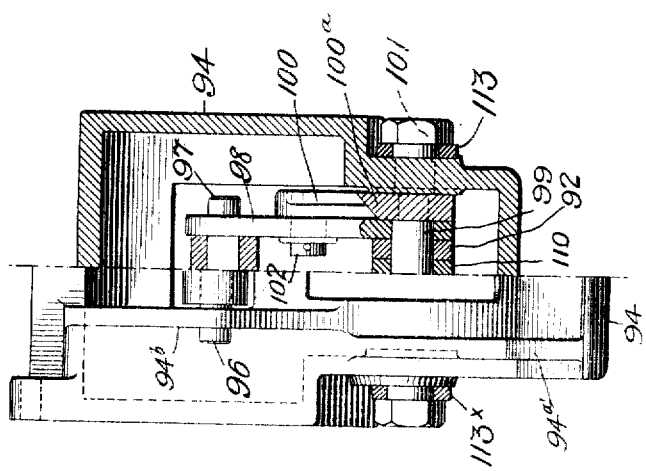

HENRY GABRIEL GINACA, OF HONOLULU, TERRITORY OF HAWAII, ASSIGNOR, BY DIRECT AND MESNE ASSIGNMENTS, OF TWO-FIFTHS TO ABRAHAM GARTENBERG, OF HONOLULU, TERRITORY OF HAWAII.

SUGAR-CANE HARVESTER.

953,265.  Specification of Letters Patent. Patented Mar. 29, 1910.

Application filed January 15, 1906. Serial No. 296,188.

*To all whom it may concern:*

Be it known that I, HENRY GABRIEL GINACA, a citizen of the United States, residing at Honolulu, county of Oahu, Territory of Hawaii, have invented a new and useful Sugar-Cane Harvester, of which the following is a specification.

This invention relates to harvesters for sugar cane, particularly to machines of this class which are provided with motor driven propelling mechanism moving over the surface of the ground for picking up and for conveying the cane cut by the cutting devices attached to the machine, and such a harvester as was referred to in my application for United States Letters Patent filed September 16th, 1905, Serial No. 278,771.

The invention consists in the construction, arrangement, and combination of parts, which will be hereinafter fully described and claimed, reference being had to the accompanying drawings forming a part of this specification, in which—

Figure 1 is a side elevation of the cutting side of a harvester constructed in accordance with the principles of my invention. Fig. 2 is a plan view of same with parts broken away. Fig. 3 is a vertical section on the line A—B of Fig. 2. Fig. 4 is a part plan and part horizontal section of the picking up and elevating mechanism. Fig. 5 is a side elevation of the operating mechanism for the cutters. Fig. 6 is a sectional elevation of said mechanism on line C—D of Fig. 7. Fig. 7 is a top plan view with parts broken away of said mechanism. Fig. 8 is a vertical section of the cutting apparatus on the line E—F of Fig. 9. Fig. 9 is a plan view of the cutting mechanism, side casing, side knife and elevator to same, parts of the cutting apparatus being broken away. Fig. 10 is a front elevation and part section of one of the cutters, the section being taken on line C² D² of Fig. 8. Fig. 10ᵃ is a view partly in section and partly in rear elevation of the cutting mechanism, the section being taken at the rear portion of the shoe casting.

Corresponding parts in the several figures are indicated by similar characters of reference.

The essential features will be separately grouped and independently described hereinafter under the following headings: the body and frame work, the propelling mechanism, steering gear, cutting apparatus, operating mechanism for cutters, the side cutter, elevator to side cutter, the picking up and elevating mechanism, stacking elevator, lifting devices for cutters and pickers, and the operating levers and controller.

*The body and frame work.*—The body of the machine is made of steel plates and angles. The rear ends of the longitudinal vertical plates 1, 2, 3 and 4 are flanged and riveted to the transverse vertical end plate 5. The forward ends of the plates 3 and 4 are attached to the side casting 7 and the casing casting 8 respectively. The transverse vertical plate 6 is riveted to the plate 1 and to the side casting 7, and the forward end of the plate 2 is riveted to said plate 6. Intermediate vertical transverse plates 9, 10, 11 and 12 are riveted between the plates 1, 2, 3 and 4, Fig. 2. To the bottom edges of the longitudinal plates 2, 3 and 4 and the transverse plates 6, 10 and 11 is riveted the bottom plate 13 for supporting the propelling mechanism and the operating mechanism for cutters hereinafter described. A plate 14 is attached to the top edges of the vertical plates mentioned and forms a table upon which the cut cane is conveyed. The rear corner of the plate 14 on the cutting side of the machine is extended and suitably braced to form a platform 14ᵃ for the operator. Portions of the plate 14 are made removable for access to the mechanisms above stated. The side casting 7 and the casing 8 are braced by a distance pipe 20 between same and a rod bolt 21 through said pipe and said castings, Fig. 7.

Vertical angles 15 15ᵃ are riveted to the plates 1 and 4, and to the upper ends of said angles are attached the longitudinal angles 16. The ends of these angles 16 are connected by the transverse angles 17. The framework thus formed is for supporting the stacking elevator hereinafter described and also for supporting screens 18 (of which only the right hand one is shown) for retaining the cut cane when stacked upon the plate 14. The vertical plate 19 is bent and attached as shown in Fig. 2. Plates are cut where necessary to clear certain sprockets and link belts hereinafter mentioned.

*The propelling mechanism.*—The castings 7 and 8 are provided with the bearings 7ᵃ and 8ᵃ respectively, in which is journaled the axle 22. Keyed to the axle 22, between the bearings 7ª and 8ª, are two narrow faced harvester wheels 23, instead of one wide faced wheel, for reasons hereinafter stated. Bearings 24 are secured to each of the plates 1 and 2, in which the axle 25 is journaled. The harvester wheel 26 is secured to the axle 25 in any desired position between the bearings 24, secured to the plates 1 and 2, in order that the distance between or gage of the wheels 23 and 26 can be varied to suit the furrows.

A motor 27 is secured upon the plate 13, as shown in Figs. 2 and 3. To the rear side of the casing of motor 27 are bolted two similar brackets 28, 29, each provided with four bearings and with a box with caps 28ª 29ª at their rear ends. In the bearings are journaled the shafts 30, 31, 32 and 33 respectively. The shaft 34 is journaled in a bearing 36 attached to the plate 2 and in the box 28ª. The shaft 35 is journaled in a bearing 37 attached to the plate 3 and in the box 29ª. Keyed to the shafts 34 and 35 are the similar sprockets 38. Similar sprockets 39 are keyed to the ends of the axles 22 and 25 respectively. Link belts 40 connect the sprockets 38 and 39. The ends of the shafts 34 and 35 are connected by a well known system of differential gears 41, (Fig. 2) by which, while both shafts are driven, one shaft may advance faster than the other. The differential gears 41 are driven by the motor 27 by means of the following gearing. The shaft 30 is provided with the gear 42 meshing with the motor pinion 27ª, and with the gear 43 meshing with a similar gear 44 on the shaft 31 between the bearings in the brackets 28 and 29. The pinion 45 on the shaft 31 meshes with the gear 46 on the shaft 32. The pinion 47 on the shaft 32 meshes with the gear 48 on the shaft 33. The pinion 49 on the shaft 33 meshes with the differential gear 41.

The ends of the shafts 31, 32 and 33 extend outside of the bearings in the bracket 29 and are connected to the shafts 51, 52 and 53 by means of the spiral jaw clutch couplings 54, 55 and 56 respectively, so that the shafts 51, 52 and 53 are driven thereby when the motor runs in the direction indicated by the arrow in Fig. 2, but are disconnected when the motor runs in the reverse direction.

The object of the shaft 30 is to raise the gear 42 so as to clear the plate 13, the location of the shaft 31 being fixed as it must line with the cam shaft 138 of the operating mechanism for cutters hereinafter described, and drive same by means of the clutch coupling 54, the shaft 51 and the coupling 139.

The object of providing the shafts 31, 32 and 33, is to obtain the various speeds and directions of rotation required for driving the different mechanisms herein described, as well as to obtain a reduction of speed from the motor to the differential gears. The clutch ends of the shafts 51, 52 and 53 are journaled in the ends of the clutches keyed to the shafts 31, 32 and 33 respectively. The other ends of the shafts 52 and 53 are journaled in bearings in the casting 50 bolted to the plate 3. The sprocket 57 on the shaft 51 drives the side cutter. The sprocket 58 on the shaft 52 drives the stacking elevator. The sprocket 59 on the shaft 53 drives the elevators for pickers and also the elevator to the side cutter.

*The steering gear.*—The rear of the body of the machine is supported by a wheel 61 mounted in the following manner such that it can be turned and the machine thereby steered. This wheel 61 revolves on the axle 62 supported in holes 63ª in opposite sides of the casting 63, which casting surrounds the wheel 61. The casting 63 is provided with a circular flange 63ᵇ suitably braced by the ribs 63ᶜ. Between the plates 5 and 10 and below the plate 14 is secured the square frame casting 64 provided with wheels 65 to turn on the pins 66 in the casting 64, two of the said wheels 65 being shown in Fig. 3. Below each corner of the frame 64 is a wheel 67 mounted to turn on pins 68 in said frame 64. The top of the flange 63ᵇ of the casting 63 forms a track upon which the wheels 65 roll, and the wheels 67 roll on and guide the outer edge of the flange 63ᵇ, when said casting 63 is turned. The wheels 67 are provided with a flange 67ª to engage the under edge of the flange 63ᵇ. The casting 63 thus arranged under the frame 64 is turned in the following manner. The sheaves 69 turn on the bars 70 bolted to the frame 64. Wire ropes or chains 71 are attached to the front and to the rear sides of the casting 63 and the opposite end of each is passed over a sheave 69 and then wound a few turns around the shaft 72 and their ends are fastened to said shaft. The shaft 72 is journaled in the boxes 73 and 74 attached to angle brackets riveted to the plates 3 and 4 respectively. To the shaft 72 is keyed the sprocket 75. A similar sprocket 76 is keyed to the shaft 77 journaled in the boxes 78 and 79 supported on the angles 80 and 81 attached to vertical angles 15 and the top of the plate 19 respectively. An operating crank 82 is attached to the shaft 77 outside of the box 78, and a set collar 83 is provided on said shaft 77 on the other side of said box 78. A link belt 84 connects the sprockets 75 and 76. By turning the crank 82 the casting 63, and therefore the wheel 61, can be turned in a horizontal plane, one chain 71 winding on and the other unwinding from the shaft 72.

To approximately level the plate 14, the height of the rear of the machine can be altered by changing the position of the axle 62 from that shown to the higher or lower holes 63ª in the casting 63.

*The cutting apparatus.*—I employ a plurality of cutting knives instead of one wide knife, three being shown, for the reason that as the knives are operated alternately the power for operating same is more nearly uniformly applied than it would be for operating one wide knife, and for the further reason that each knife can operate independently of the other knives and in different planes so as to more nearly follow the contour of the furrow or surface of the ground above the roots of the cane than could be done if one wide knife was used.

Each knife 91 is T shaped, made from sheet steel, the edges of the wide end 91ª being sharpened, and the rear end of the narrow portion 91ᵇ abuts against the shoulder 92ª of the knife-piece 92 to which it is attached by the bolt 93. For each knife 91 I provide a casting 94, the base 94ª of which acts as a shoe to slide upon the ground. The narrow portion 91ᵇ of the knife 91 can travel forward or backward between the sides of the casting 94, the knife-piece 92 being connected to the said sides of casting 94 by the following system of links to obtain a parallel motion. One end of the link 95 is pivoted by the pin 96 between the lugs 94ᵇ projecting rearward from the casting 94. The other end of this link 95 is pivoted between the upper ends of two links 98 by the pin 97. The rear end of the knife-piece 92 is pivoted between the lower ends of the said links 98 by the pin 99. The rear end of the knife-piece 92 is forked to receive the forward end of the operating-bar 110, and both are hinged together by the pin 99. The lower ends of the links 100 are pivoted on the pins 101 screwed into the sides of the casting 94 through bosses 101ˣ opposite each other and below the enlarged portion 94ᶜ of the casting, and the upper ends of these links 100 are pivoted outside of and to the centers of the links 98 by the pins 102. The links 100 are provided on each side with the wings 100ª to keep the pin 99 in place. The distances from the centers of the pins 102 to the centers of the pins 97, 99 and 101 respectively are equal.

By the system of links described a parallel motion of the knife-piece 92 is obtained. The motion of the knife 91 in moving forward is slightly downward with respect to the shoe 94ª. The object of the shoe 94ª of the casting 94 being narrower than the width of the cutting end 91ª of the knife 91 is to provide an exit for dirt on each side of the said castings 94. The upper portion 94ᶜ of each casting 94 is enlarged to the same width as that of the front end 91ª of the knife 91. To the front of this enlarged portion 94ᶜ is bolted the cover 103 by the bolts 104, this cover being preferably shaped as shown. Under the forward end or lip 103ª of said cover 103 is attached a steel plate 105 projecting forward of and on each side of said front end 103ª. The rear of the plate 105 is cut away to clear the knife-piece 92 when in its forward position, and the rear ends of the sides of said plate 105 are notched to fit against the front edges of the sides of the casting 94, as best shown in Figs. 8 and 9. The forward projecting edge of the plate 105 is preferably beveled. The object of the removable cover 103 is to provide access to the interior of the casting 94 for assembling, for oiling the pivots of the system of links and for removing the knife 91. The knife 91 slides in a slot formed between the forward portion of the shoe 94ª and the plate 105. The cover 103 is provided with a central vertical longitudinal rib 103ᵇ, under the lower edge of which the bolt 93 travels forward and backward. A plate cover 106 is hinged by the pin 107 between the lugs 94ᵈ at the extreme upper portion of the casting 94. An arm 108 attached to the cover 106 and a spring 109 attached to said arm and to the casting 94 keep the cover 106 closed against the cover plate 14.

Each casting 94 is pivoted between the forward ends of a pair of distance rods 111 on the pins 101. The rear ends of said distance rods 111 are pivoted to the casting 121 (described hereinafter under the operating mechanism for cutters) on the pins 112. These distance rods 111 are offset near their ends so as to bring the bars of each pair nearer together in order that they may clear the wheels 23, as will be understood. A preferable construction however is shown, these offsets being formed by castings 113 riveted to the ends of the rods or bars 111, said castings 113 being provided with lugs 113ª such that each pair can be bolted together with bolts 114. The operating bar 110 moves forward and backward within the space between the distance rods 111 of each pair. Each casting 94 can therefore rise or fall in a vertical longitudinal plane swinging on the pins 112 as pivots, any transverse motion being prevented by the enlarged portions 94ᶜ of said castings 94, which together about fill the space between the side casting 7 and the casing casting 8. Such swinging of each casting 94 is however limited, in its upper position by the front castings 113ᵇ touching the distance pipe 20, and in its lower position by the rope 243 hereinafter described. Each casting 94 can also tilt or swing on the pins 101 as pivots, such tilting or swinging being limited in one direction by the bottom of the enlarged portions 94ᶜ coming in contact with the top of the front castings 113ˣ on the forward ends of the distance rods 111, and limited in the other direction by the ribs 94ª′ coming in contact with the bottom of said castings 113ˣ. Owing to the fact that the enlarged portions 94ᶜ overhang the castings 113ˣ, as shown in Fig. 10ᵃ the pivotal movement of the knife casing about the pins 101 will result in the contact of said enlargement with the castings in the manner indicated; and as the ribs 94ᵃ′ are located under the rearwardly extending portions of the castings 113ˣ, as best shown in Fig. 7, the limiting of the pivotal movement of the knife casing in the opposite direction will follow.

*The operating mechanism for cutting apparatus.*—Upon the bottom plate 13, and between the side plate 4 and the partition plate 3, is secured the casting 121 comprising three elongated compartments rectangular in cross section with circular openings 121ᵃ in the rear wall of each compartment, and having the top of each compartment cut away at the forward end back to the edge 121ᵇ. Above each of the partitions 121ᶜ, separating the compartments in the casting 121, are secured the brackets 122 by the bolts 123. A bar 124 is supported by passing through bosses 122ᵃ at the upper portion of the brackets 122. Fulcrumed upon this bar 124 are three pairs of levers 125, one pair between the brackets 122 and a pair outside of each of said brackets. Each pair of levers 125 is made of two similarly shaped pieces riveted together by the rivet 126, a roller 127 with trunnions 127ᵃ being previously introduced between the levers of each pair, the trunnions 127ᵃ entering holes in the bosses 125ᵃ, such that the roller 127 thus mounted is free to turn between said pair of levers 125. The lower ends of each pair of levers 125 project into the forward end of a compartment of the casting 121, where the top of same is cut away. A pin 130 passes through holes in the bosses 125ᵇ at the lower end of each pair of levers 125.

A tube 131 is adapted to fit loosely in each of the holes 121ᵃ in the rear wall of the casting 121. A flanged cap 132 is provided for the forward end and a flanged washer 133 for the rear end of each of said tubes 131. A rod bolt 134 screwed into the cap 132 and projecting through the washer 133 and provided with nuts 135 binds the whole together. The front end 134ᵃ of the bar 134 is forked to receive the rear end of the operating bar 110. This forked end 134ᵃ as well as the rear end of the operating bar 110 are each hinged by the pin 130 between the lower end bosses 125ᵇ of a pair of levers 125.

A spiral spring 136 is placed over each tube 131 between its flanged cap 132 and the rear wall of the casting 121. A shorter and stiffer spring 137 is placed over each tube 131 outside of the casting 121 between its rear end and a flange 326 on the tube, to act as a bumper to cushion and limit the forward motion of the operating rod 110.

Journaled in the boxes 122ᵇ in the front of the brackets 122 is the cam shaft 138 provided with three cams 138ᵃ set at 120 degrees apart from each other. The cam shaft 138 at one end is connected by the coupling 139 to the shaft 51, by means of which it is revolved in the direction indicated by the arrow in Fig. 6.

When the cam shaft 138 is revolved in direction indicated, each cam 138ᵃ successively pushes against a roller 127 thereby swinging rearward its pair of levers 125 fulcrumed on the bar 124. The tube 131 is thus forced rearward through the hole 121ᵃ, the spring 136 is compressed, and the operating bar 110 is drawn rearward. As the cam shaft 138 continues to revolve the operating bar 110 is held in its rear position, the roller 127 rolling on the cam 138ᵃ until the rear end of the cam permits the levers 125 to swing forward propelled by the expansion of the spring 136.

To obtain a more rapid forward movement of the operating bar 110 and to place the starting and stopping of the cutters under the control of the operator, however, I provide the following mechanism. A steel piece 128 is secured between each pair of levers 125 by the bolt 129 through the lugs 125ᶜ and below where the levers are riveted together, as shown in Fig. 6. The bell-crank shaped pieces 141 are pivoted on the rod 142 between each pair of lugs 121ᵈ on the top of and over the centers of each compartment in the casting 121. A spring 143 attached to the top of said casting 121 by screws 144 pushes downward on the top of the rear limb 141ᵃ of the piece 141 and tends to raise the limb of the piece 141 which projects forward between the pair of levers 125 and which is provided with a renewable steel catch-piece 141ᵇ to engage the steel piece 128. On the vertical limb 141ᶜ of the piece 141 is a slidable piece 145, the central portion of its rear face being cut away. A time shaft 146 is journaled in boxes 122ᵉ in the rear portion of the brackets 122, the caps of which boxes are held in place by the bolts 147. The time shaft 146 is provided with small cams 146ᵃ set at 120 degrees apart from each other, one in the rear of and opposite each of the slidable pieces 145. Similar sprockets 148, 148ᵃ, keyed on the ends of the cam shaft 138 and the time shaft 146 respectively, and connected by the link belt 149, cause said shafts to revolve at the same speed. The rod 151 passes through holes in the bosses 122ᵈ near the top of the brackets 122. Clamped to the rod 151 are the arms 152, the ends of which are connected by the links 153 and the pins 154 to the upper ends of the slidable pieces 145. By turning the rod 151 therefore, the pieces 145 can be raised as in Fig. 5 or lowered as in Fig. 6, the pieces 145 sliding on the vertical limb 141ᶜ. When the pieces 145 are down, the cams 146ᵃ opposite them on the time shaft 146 do not hit said pieces 145 but clear them where they are cut away, when the said shaft 146 is revolved. When, however, the pieces 145 are raised, by turning the rod 151, the cams 146ᵃ successively push against the pieces 145 and move them forward against the action of the springs 143, and thus lower the catch pieces 141ᵇ releasing same from contact with the pieces 128. The cams 138ᵃ push the rollers 127 and consequently swing the pair of levers 125 sufficiently rearward so that the piece 128 is in the rear of the piece 141ᵇ, as shown in Fig. 6. The cam 138ᵃ is eased off to allow the levers 125 to move slightly forward and permit the piece 128 to be engaged by the catch piece 141ᵇ and be held by same, as the cam shaft 138 continues to revolve. The levers 125 are thus hooked-up until released by the operation of the time shaft mechanism as hereinbefore described. This unhooking or releasing is timed to occur when the cam 138ᵃ is in the position to almost immediately engage the roller 127 and again push the levers 125 to their rearward position, so that a quick withdrawal of the knife 91 is effected. Cams are employed in preference to cranks and connecting rods on account of the desired rapidity of knife withdrawal, as the knives cut into the surface of the ground they must be withdrawn rapidly and quicker than the machine advances.

*The side cutter.*—The knife 161 is clamped in a slot between two duplicate disks 162 (one of which is shown) by the screws 163, and said disks are keyed to the shaft 164 journaled in a bearing 8ᵇ of the casing casting 8. To the inner end of the shaft 164 is secured the sprocket 165. A shaft 166 is journaled in the bearings 8ᶜ and 7ᵇ of the casing 8 and casting 7 respectively, to clear the wheels 23. To the shaft 166 are keyed the sprockets 167 and 168 connected by link belts 169 and 170 to the sprockets 165 and 57 respectively. The disks 162, which act as flywheels, project through a hole 171ᵃ at the center of the cover 171 screwed to a circular rib 171ˣ of the casing 8. The cover 171 is provided with a crotch 171ᵇ similar to the crotch 8ᶠ of the casting 8.

*Elevator to side cutter.*—Inside of the casting 8 is secured the pin 172 on which the sprocket 173 turns. A shaft 174 is journaled in the bearings 8ᵈ and 7ᶜ of the casing 8 and the casting 7 respectively. A sprocket 175, similar to the sprocket 173, is keyed to the shaft 174 inside the casting 8. A link belt 176 connects the sprockets 173 and 175. Fingers 176ᵃ are attached at intervals to the link belt 176. The link belt 176 is guided between the flanges of a channel 177 attached to the front flanged edge of the casting 8 and which enters an opening 8ᵉ in said casing. A plate cover 178 is attached to the casing 8, as best shown in Figs. 1 and 7. The shaft 174 is driven from the shaft 184 of the elevators for picking up, by the link belt 179 connecting the sprocket 180 on the shaft 174 with the sprocket 190 on the shaft 184.

The object of the side cutter and elevator for same is to elevate and cut the portions of any sticks of cane which project over the path of the machine from the rows on the right hand side of the machine, the knife 161 revolving and cutting the cane elevated into the crotch 8ᶠ of the casing 8 and the crotch 171ᵇ of the cover plate 171.

*The picking up and elevating mechanism.*—To the front of the plate 6 are bolted the brackets 181, each of which supports a sleeve 182 passing through the bosses 181ᵃ and 181ᵃ′ and held in place by set screws 183 in said bosses. A shaft 184 is journaled in the sleeves 182 and has a keyway 184ᵃ cut in it its entire length. The shaft 184 is driven from the shaft 53 by the chain 205 connecting the sprocket 59 with the sprocket 206 keyed to the shaft 184. Sprockets 185 are slipped on the shaft 184, between the ends of the sleeves 182, and said sprockets are driven by means of the screws 186 in the hubs 185ᵃ of said sprockets, the points of said screws projecting into the keyway 184ᵃ of the shaft 184. On the ends of the sleeves 182 on each side of the sprockets 185 are hinged the vertical side plates 187 with collars 188 riveted to same. The upper edges of these plates 187 are flanged, and to these flanges 187ᵃ of each pair of plates 187 is riveted the cover plate 189. As shown in Fig. 4, the cover plate 189 is considerably wider than the space between the side plates 187, the cover plates being extended beyond the side plates at both sides and into close proximity to each other at their side edges. The forward end of the plate 189 is bent downward and is cut away and notched back to 189ᵃ. A notch is cut in the rear end of the plate 189 to 189ᵇ. The sides of the cover plate 189 are bent down to form the vertical sides 189ᶜ. A channel iron 191 is riveted to the remaining portion of the plate 189 at its longitudinal center. The forward end of the channel 191 starts at the edge 189ᵃ or rear of the front notch in the plate 189. The channel 191 continues rearward and is bent slightly downward where it enters the rear notch at 189ᵇ in the plate 189, as best shown in Fig. 3. A pin 192 passes through holes in the front ends of each pair of side plates 187, on which pin a sprocket 193, similar to the sprocket 185, is mounted to turn. The pins 192 are provided at each end with a washer 192ᵃ and a split pin 192ᵇ. An oval hole 187ᶜ is cut in each side plate 187, over which hole a casting 194 is riveted to the outside of said plate.

Each casting 194 is provided with two set screws 195, in opposite sides of said casting, between the points of which the flattened ends 196ª of a round bar or axle 196 are held. A sprocket 197, similar to the sprocket 193, is mounted to turn on the bar 196 between the side plates 197. A link belt 198, with fingers 198ª attached at intervals, passes over the sprockets 197, 185 and 193 respectively and is guided by the channel 191, and is driven by the sprocket 185 propelled by the shaft 184. By adjustment of the screws 195 the position of the bar 196 can be altered and the slack in the link belt 198 can be taken up.

Each elevator thus formed, six being shown in Fig. 2, can swing in a vertical plane, the collars 188 turning on the sleeves 182. Braces 199 are provided to prevent lateral motion of the forward end of each of these elevators. The front end 199ª of each brace 199 fits over the pin 192 outside of the plate 187, and the rear end 199ᵇ of each brace 199 fits over the sleeve 182 between the bosses 181ª and 181ª' of the brackets 181. The forward end of each elevator is supported by a gathering shoe 200 sliding upon the ground, the sides 200ª of which are loosely mounted on the pin 192 between the washers 192ª and the braces 199. A distance bar or link 201 is hinged by the tap bolt 202 in each side of the heel 200ᵇ of the shoe casting 200. The rear ends of said links 201 are hinged between the lugs 181ᵇ of the brackets 181 by the rod 203. The toe 200ᶜ of the shoe casting 200 acts as a picker up to raise any cut cane on the ground under which it is forced as the machine moves forward, the shoes sliding on the surface of the ground. The cane thus raised is elevated by the fingers 198ª up the cover plate 189. Covers 204 are hinged to the upper flange of plate 6.

*The stacking elevator.*—This is provided to engage the cane thus elevated up the cover plate 189 and drag it rearward and upward over the cane thus stacked on the plate 14. A frame 210 is hinged to the shaft 211 journaled in the boxes 212 and 213 bolted respectively on each side of the machine to the tops of the angles 16 of the framework, inside of which framework the frame 210 can swing. The sprockets 214 are secured at intervals to the shaft 211, and similar sprockets 215 turn on the axle 216 in the forward end of the frame 210. Endless link belts 217 with fingers 217ª at intervals, connect each sprocket 214, with the corresponding sprocket 215 in line with it. The frame 210 is raised or lowered, swinging on the shaft 211 as a pivot, by means of ropes 218 (of which only one is shown) over the sheave 219 secured to the front angle 17 of the framework, one end of the rope attached to said frame and the other end fastened to the shaft 220 upon which it is wound. The shaft 220 is journaled in boxes 221 on the tops of the angles 16, and is provided with an operating crank 222. The shaft 211 is revolved from the shaft 223 by a link belt 224 connecting the sprocket 225 on the shaft 223 with the sprocket 226 on the shaft 211. The shaft 223 is journaled in the box 227 on the angle 15ª and in the bearing 228 bolted to the plate 10.

The shaft 223 is driven from the shaft 52 by the link belt 229 connecting the sprocket 58 with the sprocket 230. The forward end of the frame 210 is provided with a guard plate 231 with openings 231ª for the sprockets 215. A plate 232 is fastened to the lower side of the frame 210. The object of these guards is to prevent the cane from entering the frame and wedging the link belt.

*Lifting devices for cutters and pickers.*—As the shoe castings 94 of the cutting apparatus and the shoe castings 200 of the picking up device are intended to slide upon the surface of the ground, it is necessary to provide means for lifting and holding up said shoes when the machine is to be moved over to an adjacent row, for example.

To each pair of distance rods 111 of the cutting apparatus a yoke 241 is secured, to which the ends of ropes 243 are clamped. These ropes 243 are passed over sheaves 244, attached to the under side of the plate 14, and are led rearward and attached to a lever on the shaft 245 journaled in the bracket 246 bolted under the plate 14ª and in a box (not shown) attached to plate 3.

To the front of the plate 6 are fastened the brackets 247 in which is journaled the shaft 248. Arms 249 are secured on the shaft 248. A chain 250 connects the end of each arm 249 with the rear portion of the cover plate 189. A rope 248ª is attached at one end to a lever 248ᵇ on the shaft 248 and at the other end to a lever on the shaft 245, as indicated in dotted lines in Fig. 3, so that the gathering shoes and their elevators may be raised.

*Operating levers and controller.*—A hand lever 251 is keyed to the end of the shaft 245 and is provided with a pawl 252 engaging a toothed quadrant 253 attached to the plate 14ª, by means of which the shaft 245 may be turned and held. A hand lever 254 is loosely mounted between set collars on the shaft 245. A rope 255 passes over the sheaves 257 and connects the lever 254 with the lever 256 on the end of the shaft 151. By means of this lever 254 the shaft 151 can be turned and the slidable piece 145 raised or lowered. A hand lever 258 is provided for operating the clutches 54, 55 and 56 in a well known manner. A controller 259 is mounted on the plate 14, in the space made by the plate 19, by which the speed of the motor 27 in either direction can be varied at the will of the operator.

The operation of the harvester, as hereinbefore described, is substantially as follows: The machine is first put in position to start cutting, with the wheel 23 in the furrow to be cut, the wheel 26 in the furrow previously cut, and the steering wheel riding the ridge between these furrows. The cutters and pickers are then lowered until their respective shoes rest upon the ground. All the clutches are thrown in and the knife releasing mechanism is put in working position. The lever of the controller 259 is thrown over to close the motor circuit thereby starting the motor and all of the mechanisms in motion. As the machine advances, the knife 91 cuts the cane close to the roots and the cut cane falls across the path of the machine where it is lifted by the shoes 200 of the pickers sufficiently to be engaged by the fingers 198ª of the elevator chains 198, which pass the cane upward until it is engaged by the fingers 217ª of chains 217 of the stacker elevator which delivers the cane piece by piece onto the plate or platform 14 on the body of the machine. All of the cane which falls or lies across the path of the machine is therefore raised by the pickers and elevated by the stacking elevator onto the body of the machine. All of the cane growing in adjacent furrows, but which lies or projects across the path of the machine, is cut by the side knife 161, the part of each stalk cut off being likewise elevated onto the body of the machine through the operation of the side knife elevator chain 176, the picker elevator chain 198 and the stacker elevator chains 217. The cane cut at the roots and falling or lying outside of the path of the movement of the machine, for instance, in the next adjacent furrow, of course, remains as it falls until it is picked up by the machine when the latter is moved over into the next furrow. When the machine arrives at the end of a furrow, the knife releasing mechanism is thrown out of action thereby holding all the knives in their rear or retracted position; the motor is stopped by operating the controller; the clutches 54, 55, 56 are thrown out of gear; the pickers and cutters are raised off the ground, and the forward end of the stacking elevator is swung up by means of ropes 218 operated by crank 222 and winding shaft 220. This permits free access to the cane which has been stacked in the body of the machine and on top of the plate or platform 14 and, when a suitable sling, which has been previously placed on the platform 14 to receive the cut cane, has been caught up, the stack or bundle of cane may be hauled off the front of the machine onto the ground, or into a vehicle designed to receive the same. When the cut cane has been thus removed from the body of the harvester, the machine is ready for another operation, the stacking elevator is lowered, and, if desired, the machine is run backward by reversing the motor and, by means of the steering wheel, is placed in position to start the cutting operation at the entrance to the next furrow. The motor is stopped and the series of operations just described is repeated.

It is obvious that the machine could be made the opposite hand from that shown if so desired.

What I claim, and desire to secure by Letters Patent, is—

1. A harvester for sugar cane comprising a body, cutting apparatus at the front of and hinged to said body, means for picking up the cut cane and leaves in front of the machine and elevating and stacking said cane and leaves on said body, and a cutting mechanism for cutting cane projecting over the path of the machine from adjacent rows.

2. A harvester for sugar cane comprising a body, cutting apparatus at the front of and hinged to said body, mechanism for operating the cutters of said cutting apparatus, means for picking up the cut cane and leaves in front of the machine and elevating and stacking said cane and leaves on said body, a motor in said body for operating said mechanisms, and cutting mechanism for cutting cane projecting over the path of the machine from adjacent rows.

3. A harvester for sugar cane comprising a body, cutting apparatus at the front and to one side of said body, mechanism for operating the cutters of said cutting apparatus, means for picking up the cut cane and leaves in front of the machine and elevating and stacking said cane and leaves on said body, a cutting mechanism on the cutting side of the machine for cutting cane projecting over the path of the machine from adjacent rows, and means for elevating such cane to said side cutting mechanism.

4. In a harvester for sugar cane, the combination of a horizontal series of cutters at the front of the machine, and a horizontal series of gatherers at the front of the machine and to one side of said cutters.

5. In a harvester for sugar cane, the combination of a horizontal series of cutters at the front of the machine, a side cutter located above the first named cutters, and a horizontal series of gatherers at the front of the machine located at the opposite side of the cutters with respect to the side cutter.

6. In a harvester for sugar cane, the combination of a series of cutters arranged in a horizontal series at the front of the machine, a horizontal series of gatherers at one side of the cutters, and individual elevators for said gatherers by which the cane and leaves are moved rearwardly of the machine.

7. In a harvester for sugar cane, the combination of cutting devices arranged in a horizontal series at the front and to one side of the machine, a side cutter at the extreme side of the machine, a horizontal series of gatherers located to one side of the cutters and at the front of the machine, and means for elevating the cane and leaves from the gatherers on to the body of the machine.

8. In a harvester for sugar cane, the combination of a body, a plurality of separate individual knife casings extending forward from the front of the body and arranged in a transverse row, said casings being pivoted to said body to tilt vertically, and a knife operating in each of said casings.

9. In a harvester for sugar cane, the combination of a plurality of individually movable knife casings, and a forwardly and rearwardly reciprocating knife operating in each of said casings.

10. In a harvester for sugar cane, the combination of a body, a plurality of knife casings, pairs of bars extending from the body and between which said casings are pivoted and individually movable, and a knife operating in each of said casings.

11. In a harvester for sugar cane, the combination of a body, a plurality of knife casings, bars connecting said casings with the body and permitting the independent tilting movement of the several casings, and forwardly and rearwardly reciprocating knives operating in said casings.

12. In a harvester for sugar cane, the combination of pairs of bars pivoted to the body of the machine, a knife casing pivoted between the forward ends of each pair of bars, a knife operating in said casing, and means carried by the casing by which the pivotal movement thereof will be limited with respect to the bars.

13. In a harvester for sugar cane, pairs of bars extending forward from the body of the machine, brackets or castings carried by the bars at their front ends, and a knife casing pivoted between the bars of each pair by means of said brackets and having means to abut against the latter in order to limit the pivotal movement of the casing in either direction.

14. In a harvester for sugar cane, parallel bars extending forward from the body of the machine, castings carried by the bars at their forward ends, and a knife casing substantially triangular in side elevation pivoted between said castings and having a flat rearward projection extending from its lower rear edge beneath the castings.

15. In a harvester for sugar cane, the combination of forwardly extending bars or links, castings carried by said bars at their forward ends, and a knife casing pivoted by its side walls between said castings and provided with a lateral enlargement to abut against the latter and thereby limit the pivotal movement of the casing in one direction.

16. In a harvester for sugar cane, the combination of a horizontal series of forwardly extending bars arranged in pairs, knife casings pivoted between the bars of each pair and individually movable, and reciprocating knives operating in said casings.

17. In a harvester for sugar cane, knives, a shoe casting for each knife, the shoes being narrower than the cutting edges of said knives, the upper portions of said shoe castings being approximately the same width as the cutting edges of said knives, for the purposes described.

18. In a harvester for sugar cane, a knife, a shoe casting, the shoe being narrower than the cutting edge of said knife, and the upper portion of said shoe casting being approximately the same width as the cutting edge of said knife.

19. In a harvester for sugar cane, a plurality of knife casings, and forwardly and rearwardly reciprocating knives operating in said casings, said knives being of greater width than the under portions of said casings.

20. In a harvester for sugar cane, a shoe casting, a knife arranged to be reciprocated forwardly and rearwardly in said casting, and a cover for the casting extending from one side edge of the knife to the other.

21. In a harvester for sugar cane, a shoe casting, and a cover attached to the front of same provided with a lip projecting forward of the front of the shoe.

22. In a harvester for sugar cane, a shoe casting, and a cover attached to the front of same provided with a lip projecting forward of the front of the shoe and also from each side of the shoe.

23. In a harvester for sugar cane, a shoe casting, a cover provided with a projecting lip, attached to said casting and forming a slot between its lower face and said casting, and a knife operating in said slot.

24. In a harvester for sugar cane, a shoe casting, a forwardly and rearwardly reciprocating knife mounted therein, and a lip projecting forward of said casting above the knife.

25. In a harvester for sugar cane, a shoe casting having a beveled front end, a forwardly and rearwardly reciprocating knife mounted in said casting, and a lip projecting forward of said casting above the cutting edge of the knife.

26. In a harvester for sugar cane, the combination of a knife casing, and a knife inclosed at its upper and lower portions by the casing and guided for reciprocation forwardly and rearwardly in the latter, said knife being projected out of the casing upon its forward movement.

27. In a harvester for sugar cane, a forwardly and rearwardly reciprocating knife, and a shoe casting coöperating therewith, said knife being inclined forward and downward with respect to base of the shoe, and the cutting edge of said knife in its rear position being above the line of the base of said shoe.

28. In a harvester for sugar cane, a forwardly and rearwardly reciprocating knife, a shoe casting coöperating therewith, said knife being inclined forward and downward with respect to the base of the shoe, and a lip projecting forward of the cutting edge of said knife when in its rear position.

29. In a harvester for sugar cane, a knife, and a shoe casting coöperating therewith, said knife being guided at its side edges by the sides of said shoe casting.

30. In a harvester for sugar cane, a knife-casing closed at the top and bottom, a knife-piece within the casing and guided in forward and rearward direction by the side walls thereof, a knife connected with the knife-piece and extending out of the casing when the knife-piece is moved forward, means for pivoting the casing at its side walls so that it may tilt vertically, and a system of links connecting the knife-piece with said side walls, as described.

31. In a harvester for sugar cane, a body, a knife casing, links or bars pivotally supporting said casing from said body but at some distance therefrom, and a plate which covers the gap between the knife casing and the body irrespective of the pivotal movement of said casing.

32. In a harvester for sugar cane, a knife casing of substantially triangular form reduced at the forward end, a knife guided in forward and rearward direction within said casing and arranged to be projected on its forward movement out of the front end of the casing, a knife-piece secured to said knife, and a reciprocating operating bar hinged to said knife-piece.

33. In a harvester for sugar cane, a knife piece, an operating bar therefor, a link 98 on each side of said knife piece, a pin 99 for hinging said pieces together, and links 100 having wings 100$^a$, for the purpose of guiding said pieces and holding the pin 99 in place.

34. In a harvester for sugar cane, a knife casing pivoted to tilt in a vertical plane, a knife inclosed in said casing and reciprocatory in forward and rearward direction, and means for reciprocating said knife irrespective of the tilting of said casing.

35. In a harvester for sugar cane, the combination of a forwardly and rearwardly reciprocating knife, an operating bar therefor, a spring acting in substantially horizontal direction on said operating bar at the rear end of the latter, a lever pivoted to said bar, and a cam acting on said lever in such manner as to effect the compression and permit expansion of said spring.

36. In a harvester for sugar cane, a reciprocating knife, a forwardly and rearwardly extending operating bar connected at its forward end with the knife, a spring acting on said bar to urge it longitudinally, a lever hinged to the bar at the rear end of the latter, and a cam to actuate said lever.

37. In a harvester for sugar cane, cutting apparatus, an operating bar connected to the cutting apparatus, a spring hingeably connected to said bar, and a lever also hingeably connected to said operating bar.

38. In a harvester for sugar cane, cutting apparatus, an operating bar connected to the cutting apparatus, a forwardly and rearwardly moving lever hinged to said bar, a cam for actuating said lever, means for holding said lever in its rearward position, and means for releasing the same.

39. In a harvester for sugar cane, a spring-pressed cutting knife, a device to retract the same, a device to transmit the movement of the retracting device to the knife, and manually controlled means for holding said transmitting device in an inoperative position against the action of the knife-spring, and releasing it from such inoperative position when desired embodying a power driven member operative to release said transmitting device at a predetermined moment.

40. In a harvester for sugar cane, a spring-pressed cutting knife, a cam to retract the same, a lever to transmit the movement of the cam to the knife, and manually controlled means for hooking up and releasing the lever, including a time-shaft operative to release said lever when the parts are in a predetermined position.

41. In a harvester for sugar cane, cutting mechanism, a reciprocating operating bar therefor, a lever hinged to said bar, a cam, means normally holding the lever in coöperation with the cam, means by which the lever can be held out of such coöperation, and a power driven device to release said holding means.

42. In a harvester for sugar cane, the combination with an inclosed body and a harvester wheel operating therein, of cutting mechanism at the front of the harvester wheel comprising a forwardly and rearwardly reciprocating knife, mechanism at the rear of the harvester wheel for automatically actuating the knife, and a connection between said mechanism and said knife which passes by the harvester wheel.

43. In a harvester for sugar cane, the combination of parallel bars or rods, a knife casing pivoted between said bars to tilt vertically, a forwardly and rearwardly reciprocating knife in said casing, and an operating bar for said knife located between and substantially parallel with said bars.

44. In a harvester for sugar cane, the combination of a casing at the side of the machine provided with a crotch, a cutter revolving in said casing, and an elevator arranged in a plane parallel and adjacent to said cutter and adapted to elevate the material into said crotch.

45. In a harvester for sugar cane, the combination of cutting apparatus at the front and to one side of the machine, a plurality of elevators independently hinged to the front of the machine at the side of said cutting apparatus, and gathering shoes supporting the forward ends of the elevators.

46. In a harvester for sugar cane, cutting apparatus arranged at one side thereof, a plurality of gathering elevators at the front of the machine and to one side of said cutting apparatus, and a stacking elevator receiving the cane from the gathering elevators and delivering the same upon the body of the machine.

47. In a harvester for sugar cane, cutting apparatus, gathering mechanism at the front of the machine embodying gathering elevators, an elevator supported above the body of the machine and extending rearward for delivering the cut cane onto the machine body, a frame above the body, and means to pull the forward end of said elevator upward toward the top of said frame to permit the cane to be discharged.

48. In a harvester for sugar cane, cutting apparatus located at one side thereof, a plurality of gathering elevators supported at the front end of the machine laterally of said cutting apparatus, and a stacking elevator supported above the body of the machine, and extending substantially the full width of the machine.

49. In a harvester for sugar cane, cutting apparatus located at one side thereof, a plurality of gathering shoes and elevator chains located on the forward part of said machine and laterally of said cutting apparatus, and means for raising and holding said shoes off of the ground.

50. In a harvester for sugar cane, cutting apparatus located at one side thereof, a plurality of gathering elevators located on the forward part of the machine and laterally of said cutting mechanism, and means for raising said cutting apparatus and said gathering elevators off of the ground.

In testimony whereof I have signed my name to this specification in the presence of two subscribing witnesses.

HENRY GABRIEL GINACA.

Witnesses:
  ROBT. J. PRATT,
  GEO. ROENITZ.